US012748892B1

(12) United States Patent
Mortensen et al.

(10) Patent No.: US 12,748,892 B1
(45) Date of Patent: Sep. 29, 2026

(54) SYSTEMS AND METHODS FOR PROVIDING A DATA TRANSLATION REGISTRY FOR SECURE CONNECTION AND INTEGRATION OF DISTINCT DATA STORAGES

(71) Applicant: Veeva Systems Inc., Pleasanton, CA (US)

(72) Inventors: Marius K. Mortensen, Burlington (CA); Seth Taylor, Bend, OR (US)

(73) Assignee: Veeva Systems Inc., Pleasanton, CA (US)

( * ) Notice: Subject to any disclaimer, the term of this patent is extended or adjusted under 35 U.S.C. 154(b) by 95 days.

(21) Appl. No.: 18/974,514

(22) Filed: Dec. 9, 2024

Related U.S. Application Data

(60) Provisional application No. 63/607,413, filed on Dec. 7, 2023.

(51) Int. Cl.
*G06F 21/62* (2013.01)
*G06F 21/78* (2013.01)

(52) U.S. Cl.
CPC ...... *G06F 21/6254* (2013.01); *G06F 21/6227* (2013.01); *G06F 21/78* (2013.01)

(58) Field of Classification Search
CPC ... G06F 21/6254; G06F 21/6227; G06F 21/78
See application file for complete search history.

(56) References Cited

U.S. PATENT DOCUMENTS

2006/0059137 A1* 3/2006 Walker .................. G06F 16/258 707/E17.14
2007/0106754 A1* 5/2007 Moore .................. G16H 40/20 707/E17.116
2013/0179187 A1* 7/2013 Jackson ................ G16H 20/10 705/3
2015/0134597 A1* 5/2015 Badea ................ G06F 16/9535 707/603
2016/0048655 A1* 2/2016 Maitra .................. G16H 70/40 705/3
2024/0055110 A1* 2/2024 Shin ...................... G16H 15/00

* cited by examiner

*Primary Examiner* — Darren B Schwartz

(57) ABSTRACT

Systems and methods for providing a data translation registry providing secure connection and integration of distinct data storages, including systems and methods for secure data integration of pharmacovigilance systems and medical data management systems. A data translation registry is established, wherein each entry corresponds to an integration event of interest. Each entry may be a specific type and may contain data in a pre-defined format according to the integration type. Notification to the target destination is sent and placed in a message queue. Integration rules are established, wherein an integration rule may contain a pre-defined priority order for scheduling a series of jobs related to the integration event.

17 Claims, 6 Drawing Sheets

SYSTEMS AND METHODS FOR PROVIDING A DATA TRANSLATION REGISTRY FOR SECURE CONNECTION AND INTEGRATION OF DISTINCT DATA STORAGES

TECHNICAL FIELD

The present disclosure relates to systems and methods for data translation registry providing secure connection and integration of distinct data storages, including systems and methods for secure data integration of pharmacovigilance systems and medical data management systems.

BACKGROUND

Pharmacovigilance is important for medication safety monitoring and post-marketing safety surveillance. However, the clinical trial industry is archaic and has largely been analog and disconnected. Transferring and processing medical data forms rely on OCR and extra processing like stand-ins for universal data formats to replicate from system to system with varying degrees of accuracy. There are additional challenges with defining unstructured and semi-structured data.

In a typical process involving a serious adverse event due to the intervention (e.g., drugs, devices, procedures, etc.) of a clinical trial, the adverse event is entered into a clinical trial data management system (e.g., medical data management system). Next, the adverse events are imported, or manually entered, into the pharmacovigilance system for case processing and reporting. After entry, the data from the pharmacovigilance and clinical trial data management system (e.g., medical data management system) needs to be reconciled to remove any discrepancies. These inconsistencies could be due to OCR, human error, a change logged in the clinical trial data management system after the initial data entry that was not reported to the pharmacovigilance system, etc. To add additional processing headaches, follow-up queries may also be required to request additional data or confirmations needed to complete case intake or processing, which adds significantly to the processing time. Serious adverse effects have strict response time requirements, where any delay can cause compliance problems.

Researchers, scientists, industry players, academics, government regulators, and other stakeholders are in need of efficient and simple ways to provide integration and secure access between pharmacovigilance systems and medical data management systems, including clinical trial electronic data. The pharmacovigilance system masks specific portions of the data of personally identifying information (PII) to provide for less violations of the law and unauthorized access to potentially compromising data/information, which makes integrating this distinct system less than straightforward. Integrating the pharmacovigilance and medical data management systems would eliminate the need for reconciliation, automate data synchronization, integrate querying, and provide faster case processing, among other advantages.

SUMMARY

Embodiments disclosed in the present document provide a machine-implemented method and system for providing a data translation registry for secure connection and integration of distinct data storages. The machine-implemented method comprising: establishing a reference data storage in a medical data management system, wherein the medical data management system stores clinical trial data; establishing a target data storage in a pharmacovigilance data management system, wherein the pharmacovigilance data management system stores data masking specific portions of the data of personally identifying information (PII); establishing a rule engine comprising one or more integration rules for one or more integration events, wherein one integration rule contains a pre-defined priority order for scheduling a series of jobs related to an integration event; establishing a data translation registry containing a set of integration events, wherein an entry in the data translation registry specifies an integration event type and contains data in a pre-defined format according to the integration event type; adding a first integration event to the data translation registry, wherein the first integration event is a modified serious adverse event case that requires changes forwarded to the medical pharmacovigilance management system; retrieving a first integration file from a URL; translating and mapping each object record in the first retrieved integration file from a first data schema of the reference data storage to a second data schema of the target data storage, wherein the first and second data schemas are distinct; and saving each translated and mapped object record in the first retrieved integration file to the pharmacovigilance data management system.

BRIEF DESCRIPTION OF THE FIGURES

For a more complete understanding of the present application and its advantages, references are now made to the following description taken in conjunction with the accompanying drawings, in which like reference numbers indicate like features.

Although similar reference numbers may be used to refer to similar elements for convenience, it can be appreciated that each of the various example embodiments may be considered to be distinct variations.

Figure 1:
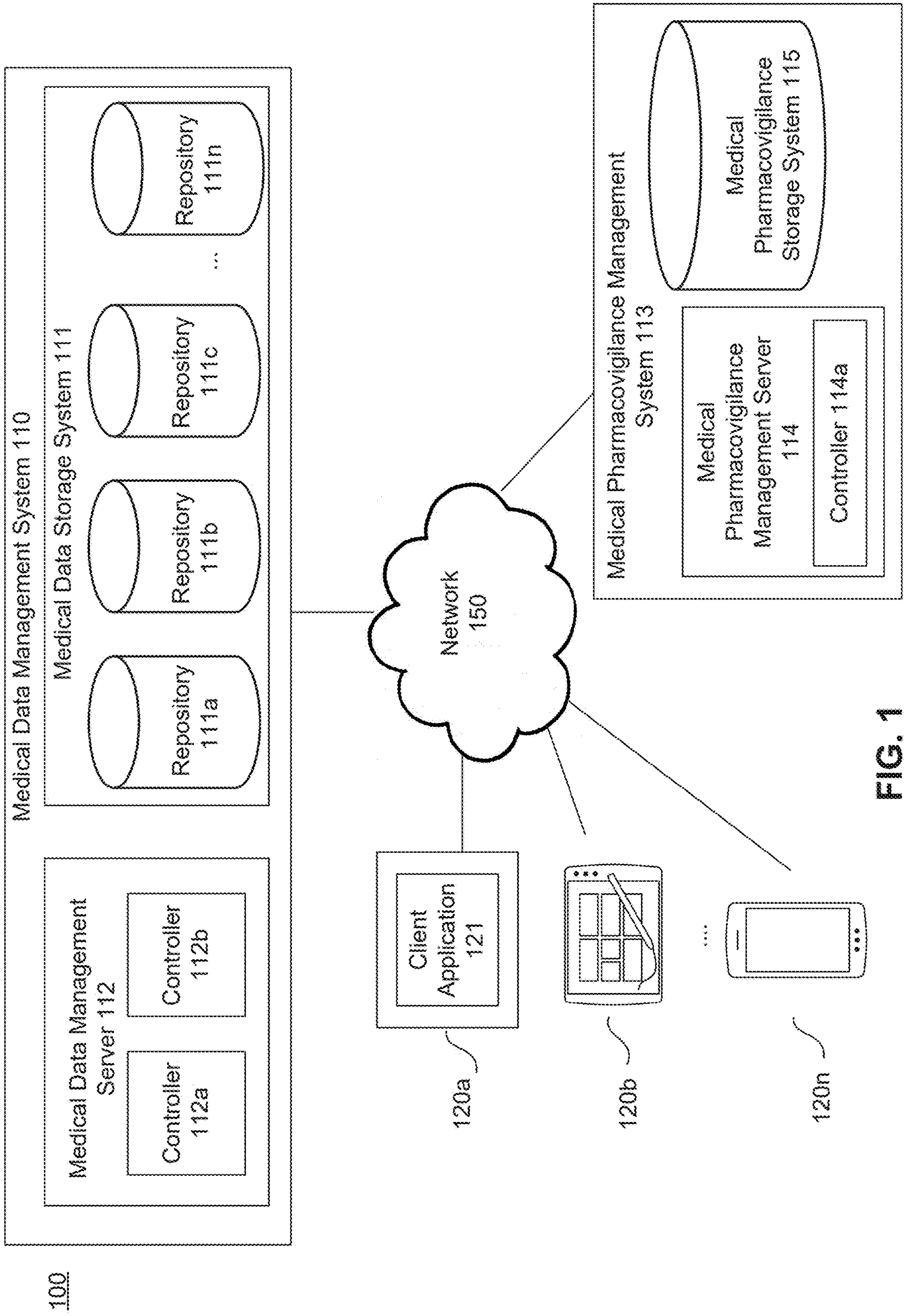
FIG. 1 illustrates an example high level block diagram of an architecture providing a data translation registry for secure connection and integration of distinct data storages wherein the present invention may be implemented.

The present embodiments will now be described hereinafter with reference to the accompanying drawings, which form a part hereof, and which illustrate example embodiments which may be practiced. As used in the disclosures and the appended claims, the terms "embodiment" and "example embodiment" do not necessarily refer to a single embodiment, although it may, and various example embodiments may be readily combined and interchanged, without departing from the scope or spirit of the present embodiments. Furthermore, the terminology as used herein is for the purpose of describing example embodiments only, and are not intended to be limitations. In this respect, as used herein, the term "in" may include "in" and "on," and the terms "a", "an", and "the" may include singular and plural references. Furthermore, as used herein, the term "by" may also mean "from," depending on the context. Furthermore, as used herein, the term "if" may also mean "when" or "upon," depending on the context. Furthermore, as used herein, the words "and/or" may refer to and encompass any and all possible combinations of one or more of the associated list items. For a more complete understanding of the present application and its advantages, references is now made to the following description taken in conjunction with the accompanying drawings, in which like reference numbers indicate like features.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

The current process for customers (e.g., pharmaceutical companies or clinical trial sponsors) to enter serious adverse events to the medical pharmacovigilance systems is to output PDFs of the required information and submitting those for manual entry into the system. Extra processing is required to input the data and reconciliation is needed to make sure there are no transcribing errors. Due to the manual nature of the practice, any delays communicating between the two systems would place significant risk on compliance as there are strict response time requirements for processing clinical trial safety cases. Similarly, any updates made to the original information would require repeating the time-consuming process above. Integrating the pharmacovigilance and medical data management systems would eliminate the need for reconciliation, automate data synchronization, and integrate querying, which would provide faster clinical trial case processing and reduce the risk of compliance problems due to delays in processing.

Referring generally to the figures, systems and methods for providing a data translation registry for secure connection and integration of distinct data storages are disclosed. The systems and methods described herein provide for secure data integration of medical pharmacovigilance systems and medical data management systems.

As used herein, the term "event," "medical event," or "adverse event" can include any untoward medical occurrence which happens to either a patient or a subject in a clinical investigation or during regular use of a medical product that has been given to that person. For example, the "event," "medical event," or "adverse event" may encompass any signs which are unfavorable and unexpected for the patient or subject, including any abnormal laboratory findings such as a high blood pressure, a rapid heart rate, etc. The "event," "medical event," or "adverse event" could be symptoms, or a disease temporally associated with the use of a medical product and does not have to have been previously associated with that product. The term "event," "medical event," or "adverse event" can further encompass adverse reactions and serious adverse events such as death, life-threatening adverse experiences, inpatient hospitalization, congenital birth defects, disabilities, etc. Further, each "event," "medical event," or "adverse event" may be defined by the Medical Dictionary for Regulatory Activities (MedDRA) (or other medical code dictionaries) and associated with a specific MedDRA code. Moreover, "event information" "medical event information" "adverse event information" "event data" "medical event data" or "adverse event data" can include information associated with the event such as the date of onset of the event, the date of cessation of the event, the type of event, the dictionary (i.e., digital dictionary, medical dictionary, digital medical dictionary, etc.) or medical term (e.g., MedDRA term), the dictionary or medical code (e.g., MedDRA code), event comments, the outcome of the event, the location of the event (e.g., country where the event occurred), the event duration, patient data for a patient who endured or to which the event occurred, medical products that the patient consumed and/or dosages for the consumed medical products, the event rank, event contacts, the event type, and any associated event documents.

Referring now to FIG. 1, an exemplary high level block diagram of a medical data management architecture 100 is shown, wherein the present invention may be implemented. The architecture 100 may include a medical data management system 110, medical pharmacovigilance management system 113, and a plurality of user computing devices 120*a*, 120*b*, . . . 120*n*, coupled to each other via a network 150. The medical data management system 110 may include a medical data storage system 111 and a medical data management server 112. The medical data storage system 111 may have two or more repositories, e.g., 111*a*, 111*b*, 111*c*, . . . and 111*n*. The medical pharmacovigilance management system 113 may include a medical pharmacovigilance management server 114 and a medical pharmacovigilance storage system 115. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The computing devices 120*a*-120*n* may be any machine or system that is used by a user to access the medical data management system 110 via the network 150, and may be any commercially available computing devices including laptop computers, desktop computers, mobile phones, smart phones, tablet computers, netbooks, and personal digital assistants (PDAs). A client application 121 may run from a user computing device, e.g., 120*a*, and access data in the medical data management system 110 via the network 150.

The medical data storage system 111 may store medical data that client applications (e.g., 121) in user computing devices 120*a*-120*n* may access and may be any commercially available storage devices. Each content repository (e.g., 111*a*, 111*b* or 111*n*) may store a specific category of data, and allow users to interact with its data in a specific business context. It should be appreciated that content repositories may be separate logic sections in a same storage device.

The medical data management server 112 is typically a remote computer system accessible over a remote or local network, such as the network 150. The medical data management server may store a medical data management controller 112*a* and a medical data collection controller 112*b* for controlling management and collection of the medical data, including the method to be discussed with FIG. 6. The medical data management server 112 could be any commercially available computing devices. Although only one server is shown, it should be appreciated and the medical data management system 110 may have a plurality of servers and the controllers 112*a* and 112*b* may be in separate servers. A client application (e.g., 121) process may be active on one or more user computing devices 120*a*-120*n*. The corresponding server process (e.g., 112*a* and 112*b*) may be active on the medical data management server 112. The client application process and the corresponding server process may communicate with each other over the network 150, thus providing distributed functionality and allowing multiple client applications to take advantage of the information-gathering capabilities of the medical data management system 110.

In one implementation, the architecture 100 may be used for aggregating and managing medical data, e.g., clinical trial data. A first repository (e.g., 111*a*) may be used by a first sponsor (e.g., a pharmaceutical company) to store a first study design received from a first computing device (e.g., 120*a*). The first study design may define the infrastructure and lifecycle of the study, and may comprise rules (e.g., for queries, derived values, notifications and displaying events, forms and items), a casebook (i.e., a doctor's binder), event groups, events (e.g., patients visits), forms which comprise segregated sections and fields, item groups and items. In one example, a study design may define a particular study, i.e., each patient may have ten visits, and each visit may have three forms. There may be a workflow associated with each visit, e.g., what needs to be done at each visit.

In one implementation, the first study design may be stored as definition objects in the first repository 111*a*, specifying what is required to happen on each site during the study. The first repository 111*a* may also store electronic records of the first study. In one implementation, the electronic records may be EDC data. Patient clinical trial source data may be captured at the user computing devices, and the aggregated and obfuscated data may be stored as EDC data in the first repository 111*a*.

The second repository 111*b* may be used by a first site (e.g., a hospital) of the first study to store clinical trial source data from a second user computing device (e.g., 120*b*), and a third repository (e.g., 111*c*) may be used by a second site of the first study to store clinical trial source data from a third user computing device (e.g., 120*c*). The clinical trial source data (e.g., three blood pressure values of a patient taken during one visit) in the second repository 111*b* may be converted to EDC data (e.g., the average of the three blood pressure values) automatically, and then stored in the first repository 111*a* as EDC data. Similarly, the clinical trial source data in the third repository 111*c* may be converted to EDC data automatically, and then stored in the first repository 111*a* as EDC data. In one implementation, the clinical trial source data may be converted to the EDC data at the client application 121, and the EDC data is transmitted to the medical data management server 112. In one implementation, the clinical trial source data may be transmitted to the repository 111*b* or 111*c* via the medical data management server 112, and converted to the EDC data at the medical data management server 112. The EDC data is then stored in the repository 111*a*. Data in the second repository 111*b* and the third repository 111*c* may be synchronized with that in the first repository 111*a* regularly or from time to time when new data entries are received from user computing devices. The first study design may be transmitted to the second repository 111*b* and the third repository 111*c*. The second repository and the third repository may be synchronized with the first repository for updates to the first study design.

In another implementation, the medical data collection controller 112*b* may control the collection of the medical data, while the medical data management controller 112*a* may control the operations and management of the clinical trial, including jobs or assignments to facilitate the real-time visibility and execution of the clinical trial. For instance, the clinical trial source data may be converted to the EDC data at the client application 121, and the EDC data is transmitted to the medical data collection controller 112*b*. In one implementation, the clinical trial source data may be transmitted to the repository 111*b* or 111*c* via the medical data collection controller 112*b*, and converted to the EDC data at the medical data collection controller 112*b*. The medical data management controller 112*a* may receive the EDC data from the medical data collection controller 112*b*. The medical data management controller 112*a* may then manage reimbursements to research sites and tracks the study budgets based on the received EDC data. The medical data management controller 112*a* may also provide study management and monitoring capabilities. The medical data management controller 112*a* may generate dashboards and reports tracking key indicators including enrollment and milestones based on the EDC data received from the medical data collection controller 112*b*.

In another implementation, a first repository (e.g., 111*a*) may be used by a sponsor (e.g., a pharmaceutical company) using a first computing device (e.g., 120*a*) to store EDC data received from a site (e.g., local lab) using a second computing device (e.g., 120*b*). The EDC data input by the second computing device may contain questionable content requiring verification. Queries may be created by the first computing device and managed by the medical data management server 112. The site (e.g., a local lab) may use the first repository (e.g. 111*a*) from a second user computing device (e.g., 120*b*) to answer the queries managed by the medical data management server 112. Upon satisfactory response, the query can be closed by the medical data management server 112. Alternatively, the first computing device (e.g., 120*a*) may create a subsequent query to be managed by the medical data management server 112.

In one implementation, the medical data management system 110 may be a multi-tenant system where various elements of hardware and software may be shared by one or more customers. For instance, a server may simultaneously process requests from a plurality of customers (e.g., sponsors, and clinical sites), and the medical data storage system 111 may store content for a plurality of customers (e.g., sponsors, and clinical sites). In a multi-tenant system, a user is typically associated with a particular customer. In one example, a user could be an employee of one of a number of pharmaceutical companies or clinical trial sites which are tenants, or customers, of the medical data management system 110.

In one embodiment, the medical data management system 110 may run on a cloud computing platform. Users can access content on the cloud independently by using a virtual machine image, or purchasing access to a service maintained by a cloud database provider.

In one embodiment, the medical data management system 110 may be provided as Software as a Service ("SaaS") to allow users to access the medical data management system 110 with a thin client.

The medical pharmacovigilance storage system 115 may store medical safety data that client applications (e.g., 121) in user computing devices 120*a*-120*n* may access and may be any commercially available storage devices. The medical safety data may include a wide variety of longitudinal health information, HCP information, and consumer information, wherein the longitudinal health information comprises consistently deidentified private health information (PHI). The medical pharmacovigilance storage system 115 may be used to make associations across all the received information while protecting the patients' identities based solely on the deidentified PHI of the health information, which reduces the complexity of the analysis of the longitudinal health information, HCP information, and consumer information and therefore requires less processing power by the systems described herein. For example, instead of having to associate separately received health information based on multiple matching attributes (e.g., zip code, type of medical coverage, cost of medical procedure, etc.), the systems described herein can associate the separately received health information based solely on the deidentified PHI of the health information, due to the consistent deidentification of the PHI.

The medical pharmacovigilance management server 114 is typically a remote computer system accessible over a remote or local network, such as the network 150. The medical pharmacovigilance management server may store a controller 114*a* for controlling management and collection of the medical safety data, including the method to be discussed with FIG. 6. The medical pharmacovigilance management server 114 could be any commercially available computing devices. Although only one server is shown, it should be appreciated and the medical pharmacovigilance management system 113 may have a plurality of servers and the controllers may be in separate servers. A client application (e.g., 121) process may be active on one or more user computing devices 120*a*-120*n*. The corresponding server process (e.g., 114*a*) may be active on the medical pharmacovigilance management server 114. The client application process and the corresponding server process may communicate with each other over the network 150, thus providing distributed functionality and allowing multiple client applications to take advantage of the information-gathering capabilities of the medical pharmacovigilance management system 113.

In one implementation, the medical pharmacovigilance management system 113 may be a multi-tenant system where various elements of hardware and software may be shared by one or more customers. For instance, a server may simultaneously process requests from a plurality of customers (e.g., pharmaceutical company), and the medical pharmacovigilance management system 113 may store content for a plurality of customers (e.g., pharmaceutical company). In a multi-tenant system, a user is typically associated with a particular customer. In one example, a user could be an employee of one of a number of pharmaceutical companies which are tenants, or customers, of the medical pharmacovigilance management system 113.

In one embodiment, the medical pharmacovigilance management system 113 may run on a cloud computing platform. Users can access content on the cloud independently by using a virtual machine image, or purchasing access to a service maintained by a cloud database provider.

In one embodiment, the medical pharmacovigilance management system 113 may be provided as Software as a Service ("SaaS") to allow users to access the medical pharmacovigilance management system 113 with a thin client.

Figure 2:
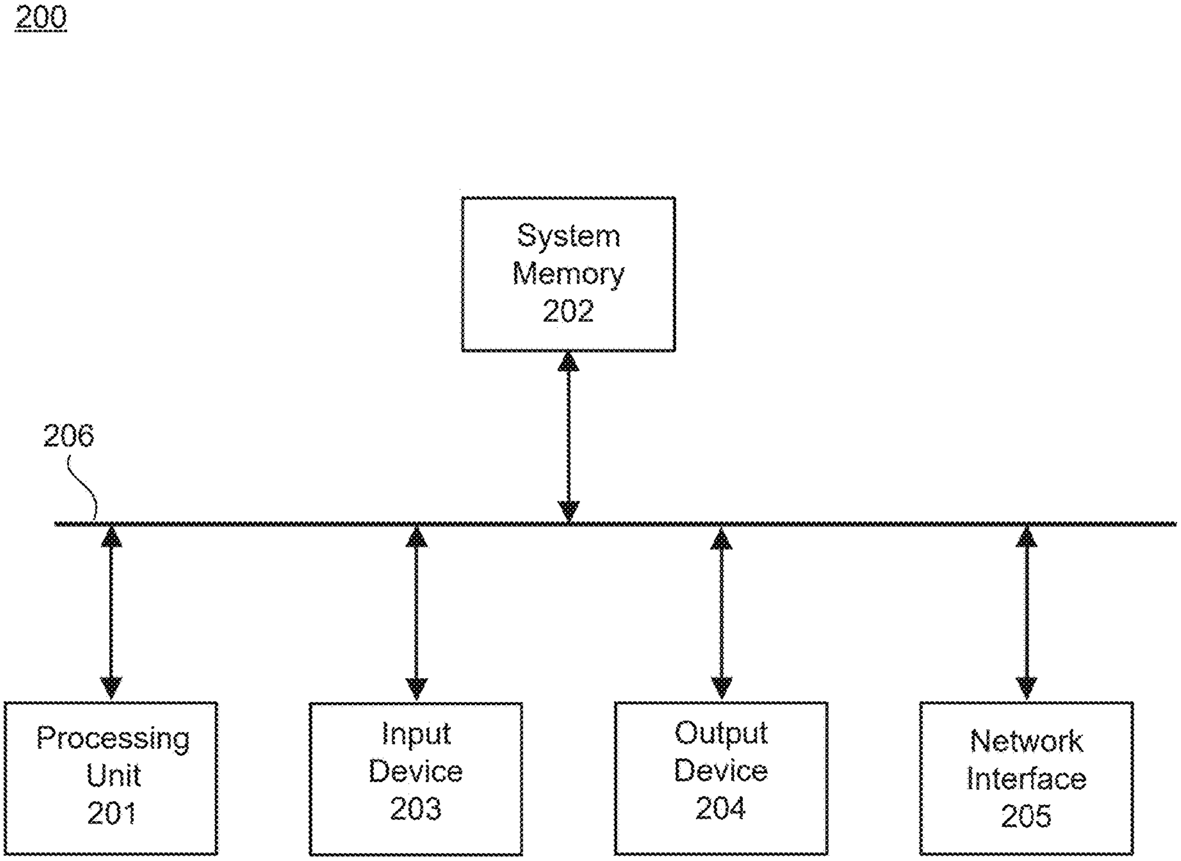
FIG. 2 illustrates an example block diagram of a user computing device wherein the present invention may be implemented.

Referring now to FIG. 2, a block diagram of a computing device 200 which can be used as the user computing devices 120*a*-120*n*, and the medical data management server 112 in FIG. 1 is shown, according to an example embodiment. The computing device 200 is only one example of a suitable computing environment and is not intended to suggest any limitation as to scope of use or functionality. The computing device 200 may include a processing unit 201, a system memory 202, an input device 203, an output device 204, a network interface 205 and a system bus 206 that couples these components to each other.

The processing unit 201 may be configured to execute computer instructions that are stored in a computer-readable medium, for example, the system memory 202. The processing unit 201 may be a central processing unit (CPU).

The system memory 202 typically includes a variety of computer readable media which may be any available media accessible by the processing unit 201. For instance, the system memory 202 may include computer storage media in the form of volatile and/or nonvolatile memory such as read only memory (ROM) and/or random access memory (RAM). By way of example, but not limitation, the system memory 202 may store instructions and data, e.g., an operating system, program modules, various application programs, and program data.

A user can enter commands and information to the computing device 200 through the input device 203. The input device 203 may be, e.g., a keyboard, a touchscreen input device, a touch pad, a mouse, a microphone, and/or a pen.

The computing device 200 may provide its output via the output device 204 which may be, e.g., a monitor or other type of display device, a speaker, or a printer.

The computing device 200, through the network interface 205, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 205 may be configured to allow the computing device 200 to transmit and receive data in a network, for example, the network 150. The network interface 205 may include one or more network interface cards (NICs).

Figure 3:
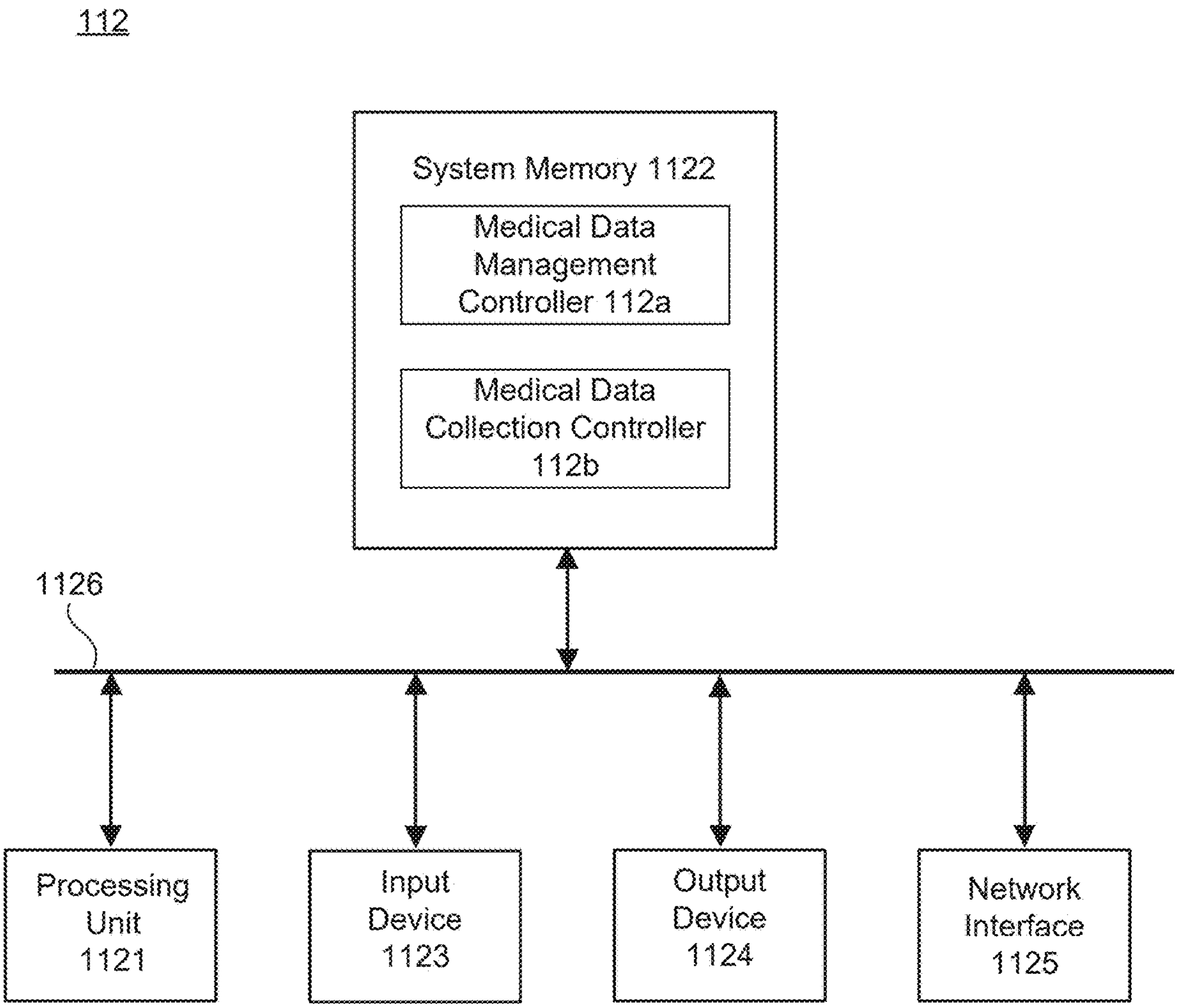
FIG. 3 illustrates an exemplary high level block diagram of a medical data management server according to one embodiment of the present invention.

Referring now to FIG. 3, a high-level block diagram of the medical data management server 112 is shown, according to one embodiment of the present invention. The medical data management server 112 may be implemented by the computing device 200, and may have a processing unit 1121, a system memory 1122, an input device 1123, an output device 1124, and a network interface 1125, coupled to each other via a system bus 1126. The system memory 1122 may store a medical data management controller 112*a* and a medical data collection controller 112*b*.

In one implementation, the medical data management controller 112*a* may be a Java application. A sponsor user may design a clinical study via the medical data management controller 112*a* and store the study design as definition objects in a repository (e.g., 111*a*). The clinical study design may be based on the clinical trial protocol, or the preferences of the sponsor user. A study design may have multiple elements, including a casebook, groups, events (e.g., patient visits), and forms which include sections, item groups, items, and fields to be filled out. In one implementation, each event may be configured with associated event modalities available based on the clinical trial protocol or preferences of the sponsor user. The default event modality options may be selected from a pre-defined standardized list.

In one example, a clinical trial is designed to evaluate patient response to a blood pressure medication. Participants on the medication may check in with clinical trial staff three times a week for consecutive six weeks. A workflow may be designed for each visit, and may include forms to be filled out, measurements to be taken, and whether different event modalities are available for each visit. In one example, a participant's blood pressure may be measured three times during On Site Visit 1, 6, 12, and 18, stored in the medical data storage system (e.g., the repository 111_b_) as clinical trial source data, and synchronized with other repositories in the medical data storage system 111 (e.g., the repository 111_a_ for the sponsor). Screening for adverse events may be done during a "Virtual Visit" on Visit 9 and 18. In one implementation, only aggregated and obfuscated data, without patient defining information, are sent to the sponsor repository 111_a_ and stored there as the EDC data.

A study design may have its own lifecycle. Once a sponsor completes a study design, a workflow may be executed to publish the study design to the participating clinical trial sites (e.g., by storing the study design in clinical trial site repositories 111_b_ and 111_c_) and the clinical trial may enter its execution stage. If the study design is amended during the execution stage, the updates may be sent to the participating clinical trial sites (e.g., by synchronizing the updates down to the clinical trial site repositories 111_b_ and 111_c_) for them to follow.

Figure 4:
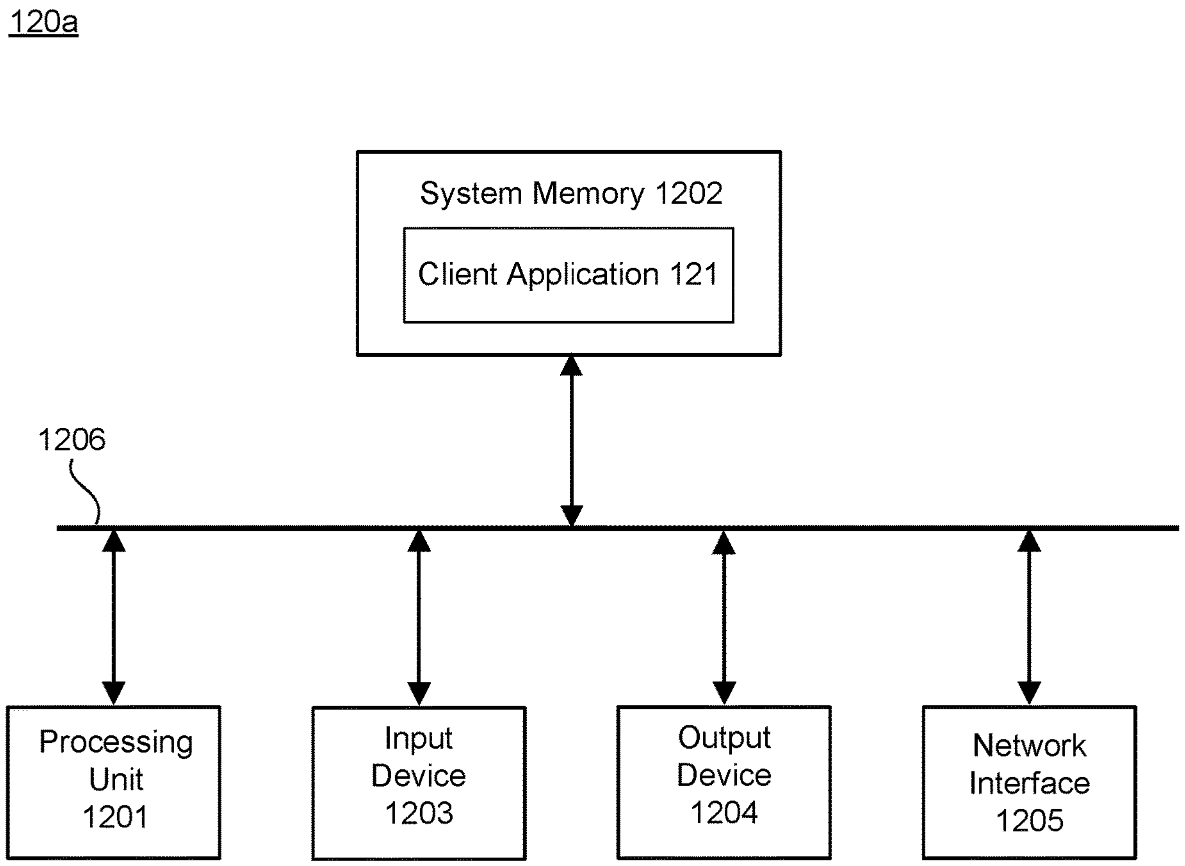
FIG. 4 illustrates an example high level block diagram of a user computing device according to one embodiment of the present invention.

Referring to FIG. 4, a high-level block diagram of a user computing device (e.g., 120_a_) is shown, according to an example embodiment of the present invention. The user computing device 120_a_ may be implemented by the computing device 200 described above, and may have a processing unit 1201, a system memory 1202, an input device 1203, an output device 1204, and a network interface 1205, coupled to each other via a system bus 1206. The system memory 1202 may store the client application 121.

The client application 121 may be an application installed on a computing device, or a web application. Users at a clinical trial site (e.g. local lab) may enter patient clinical trial information via the client application 121, and the clinical trial source data may be stored in a repository (e.g., 111_b_).

Figure 5:
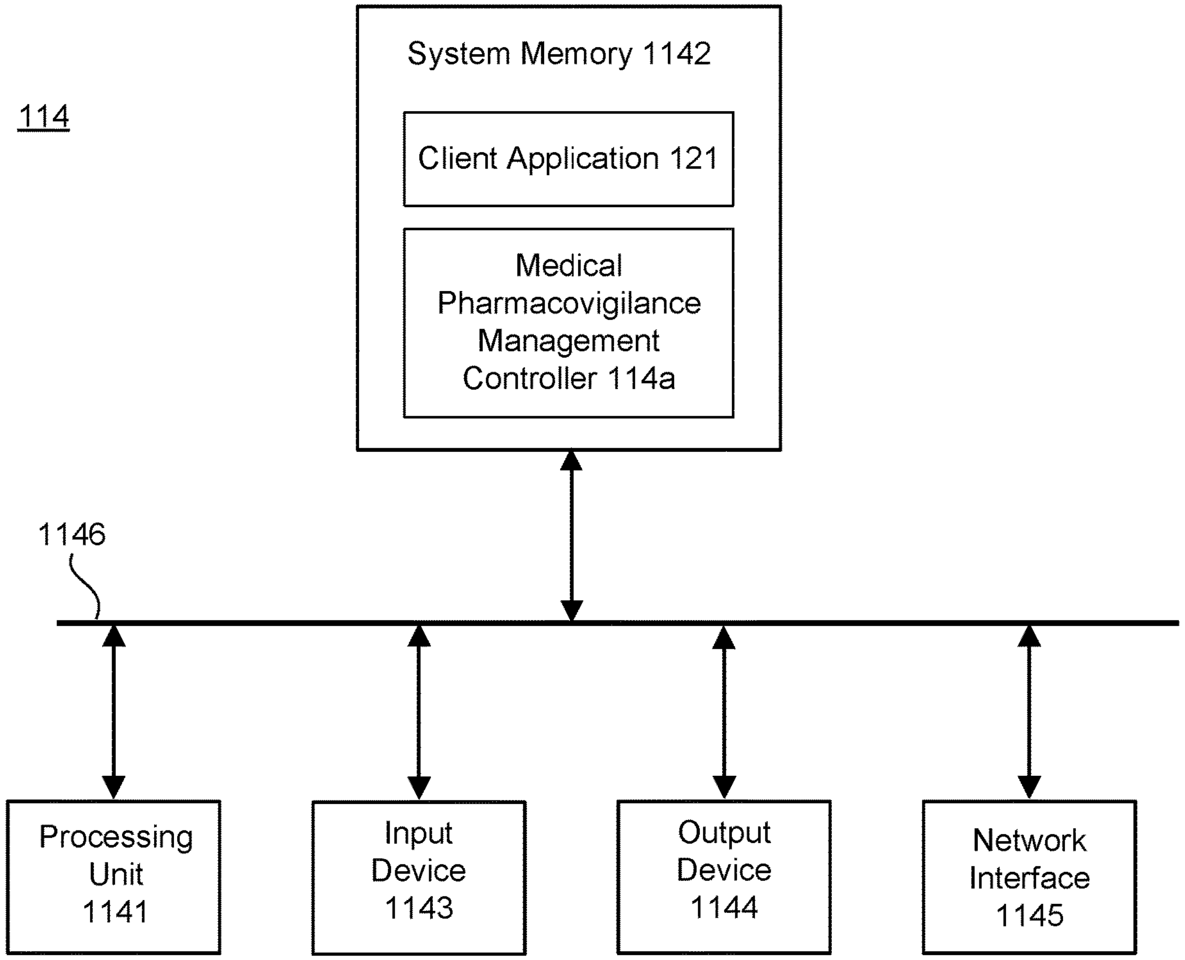
FIG. 5 illustrates an example high level block diagram of a medical pharmacovigilance management server according to one embodiment of the present invention.

Referring now to FIG. 5, a high-level block diagram of a medical pharmacovigilance management server (e.g., 114) is shown, according to an example embodiment of the present invention. The medical pharmacovigilance management server 114 may be implemented by the computing device 200 described above and may have a processing unit 1141, system memory 1142, an input device 1143, an output device 1144, and a network interface 1145, coupled to each other via a system bus 1146. The system memory 1142 may store the client application 121.

In some embodiments, the medical pharmacovigilance management server 114 may act as a host and provide a client application 121 (e.g., a web-based application, a mobile application, etc.) to the user computing device 120_a_ over the network 150 in response to authenticating the respective computing device. For example, the medical pharmacovigilance management server 114 may receive authentication data (e.g., a username and corresponding password, a limited-use key, a two-factor authentication code or key, etc.) from one of the user computing devices 120_a_. The medical pharmacovigilance management server 114 may then authenticate the user computing device 120_a_ based on the authentication data and provide an application to the user computing device 120_a_ over the network 150.

The network interface 1145 is structured to establish connections with the user computing devices 120_a_ by way of the network 150. The network interface 1145 includes program logic and/or hardware-based components that connect the medical pharmacovigilance management server 114 to the network 150. For example, the network interface 1145 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver).

In some embodiments the network interface 1145 may include AS2 gateway logic (not shown) that includes programmable instructions that facilitate communication (transmission and receipt) using the AS2 Gateway communication protocol (as specified in Request for Comment (RFC) 4130) over the network 150 via the network interface 1145. For example, using the AS2 gateway logic, the network interface 1145 may transmit or receive files (e.g., the source file, a case, etc.) or other data to the user computing devices 120_a_ using the AS2 Gateway protocol.

In some embodiments, the network interface 1145 may include electronic Common Technical Document (eCTD) logic (not shown) that includes programmable instructions that facilitate communication (transmission and receipt) using the eCTD protocol (as specified by the FDA in the eCTD guidance or by other health agencies) over the network 150 via the network interface 1145. For example, using the eCTD logic, the network interface 1145 may transmit or receive files (e.g., the source file, a case, etc.) or other data to the user computing devices 120_a_ using the eCTD communication protocol.

In some embodiments, the network interface 1145 includes the hardware and machine-readable media structured to support communication over multiple channels of data communication (e.g., wireless, Bluetooth, near-field communication (NFC). In some embodiments, the network interface 1145 includes cryptography logic and capabilities to establish a secure communications session.

Figure 6:
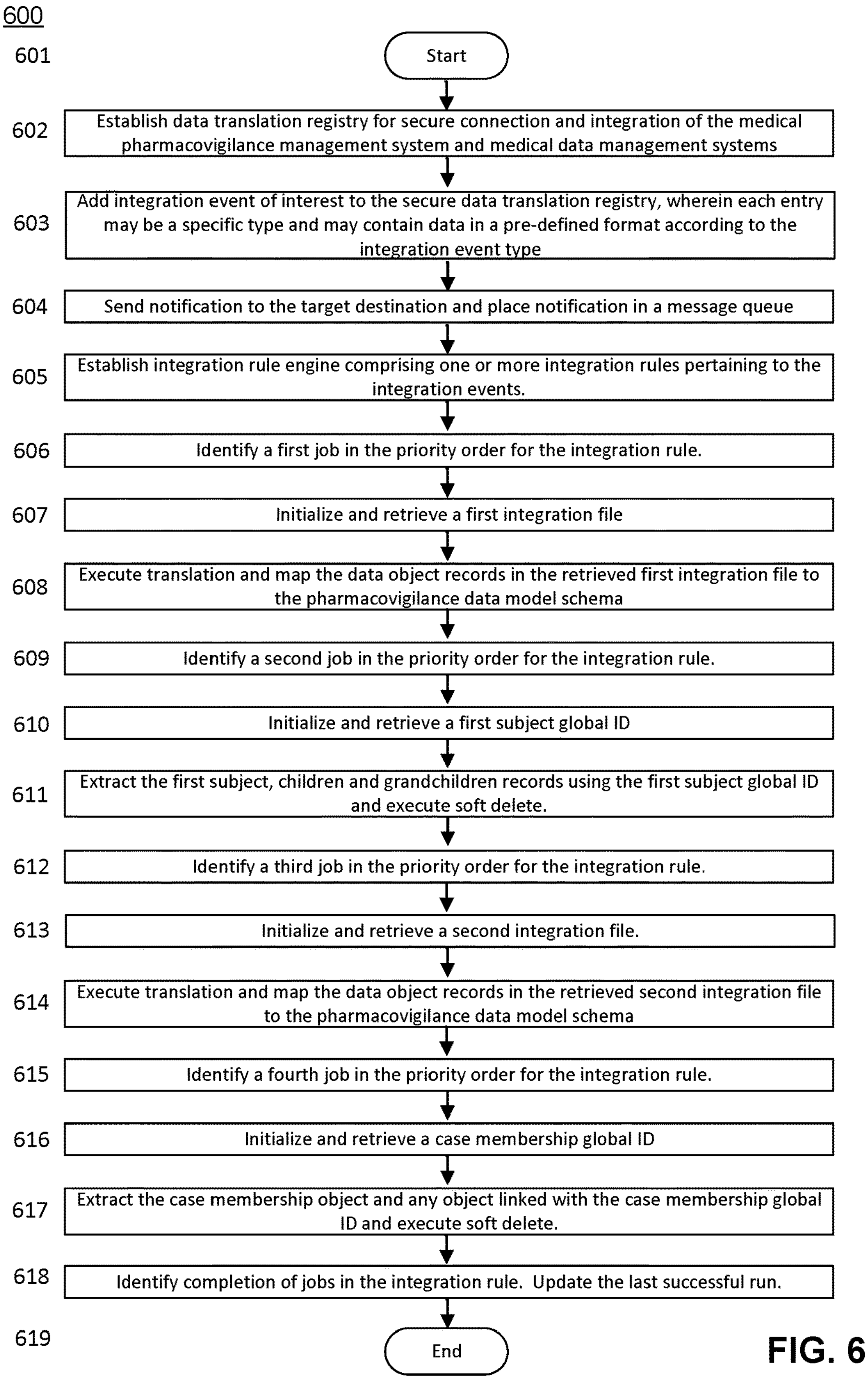
FIG. 6 illustrates an exemplary flow diagram of a method for secure connection and integration of distinct data storages utilizing a secure data translation registry according to one embodiment of the present invention.

Referring now to FIG. 6, an exemplary flow diagram of a method for secure connection and integration of distinct data storages utilizing a secure data translation registry 600 is shown, according to one embodiment of the present invention. The method begins at 601.

At 602, a secure data translation registry is established for secure connection of two distinct data storages, specifically integration of the medical pharmacovigilance management system 113 and medical data management system 110. In one implementation, the secure data translation registry is an integration event table, wherein each entry may be a specific integration event type and may contain data in a pre-defined format according to the integration event type. The integration event may be any interaction between the reference and target destination systems where data is exchanged. Translation may be needed between the respective data schemas. The data in the pre-defined format may be stored in JSON format. The event may contain an event name, a target destination, and the data exchanged. In another implementation, the event table entry may store a global ID, event type, and an attachment reference, wherein the attachment reference is a URL that can be used to retrieve the data to be exchanged in JSON format.

In one implementation, the integration event type may be an insert or update of subject information, insert or update of case membership information, or deletion of a subject information, deletion of a case membership information.

In one implementation, translation may be performed between a first data schema of the medical data management system 110 and a second data schema of the medical pharmacovigilance management 113, wherein the first and second data schema are distinct.

At 603, the medical data management controller 112*a* may add an integration event of interest to the secure data translation registry. The medical data management controller 112*a* may have modified a serious adverse event case and needs to forward the changes to the medical pharmacovigilance management system 113. In one implementation, the modification of the serious adverse event may be an insert or update of the subject information, an insert or update of case membership information, deletion of a subject, or deletion of a case.

At 604, after the entry is saved to the event table, the medical data management controller 112*a* sends a notification to the target destination (e.g., pharmacovigilance management controller 114*a*) and placed in a message queue. The message queue may be used between multiple systems to track notifications of data exchange requests. In one implementation, the medical data management controller 112*a* may add a notification to the message queue with a connection ID that indicates subject and serious adverse event case info required for processing. There may be an aggregation or deduplication lockout for a specified time such that multiple notifications are minimized. For instance, if there is a 5 minute aggregation lockout set, then when an event is saved to the secure data translation registry at 12:00 pm and then another event to the same target destination at 12:03 pm, only one notification is sent and placed in the message queue.

At 605, the medical pharmacovigilance management controller 114*a* establishes an integration rule engine. In one implementation, the integration rule engine may consist of one or more integration rules. For example, one integration rule may contain a pre-defined priority order for scheduling a series of jobs related to the integration event.

At 606, the medical pharmacovigilance management controller 114*a* executes a first job for the integration event. In one implementation, the medical pharmacovigilance management controller 114*a* may execute a job for subject data insert/update. In another implementation, the medical pharmacovigilance management controller 114*a* may execute a job for synchronization.

At 607, the medical pharmacovigilance management controller 114*a* initializes and retrieves an integration file. In one implementation, the medical pharmacovigilance management controller 114*a* retrieves an attachment URL. The attachment URL may link to a JSON file where subject data to be integrated is contained. The JSON file from the attachment URL may be retrieved using VQL or accessing an API call. In another implementation, the medical pharmacovigilance management controller 114*a* may initialize and retrieve all the IDs of an object record that has changed since the last successful run.

At 608, the medical pharmacovigilance management controller 114*a* executes the integration by translating and mapping the data object records in the retrieved JSON file in 607 to the pharmacovigilance data model schema. After completion of the translation, the integration data in the JSON file is saved into the medical pharmacovigilance management database 115.

At 609, the medical pharmacovigilance management controller 114*a* determines if there are additional jobs to run. If so, the medical pharmacovigilance management controller 114*a* schedules the next job in the priority order defined in the integration rule for the integration event. In one implementation, the medical pharmacovigilance management controller 114*a* may execute a second job for the integration event, specifically a job for subject delete.

At 610, the medical pharmacovigilance management controller 114*a* initializes and retrieves the subject global ID. The subject global ID may allow the identification of the subject to be deleted, and any related children and descendants. The medical pharmacovigilance management controller 114*a* populates any related children and grandchildren of the subject using the global ID.

At 611, the medical pharmacovigilance management controller 114*a* extracts the subject with the subject global ID retrieved in 610, as well as all children and grandchildren, and executes a soft delete.

At 612, the medical pharmacovigilance management controller 114*a* determines if there are additional jobs to run. If so, the medical pharmacovigilance management controller 114*a* schedules the next job in the priority order defined in the integration rule for the integration event. In one implementation, the medical pharmacovigilance management controller 114*a* executes the third job for the integration event, specifically a job for case membership data insert/update.

At 613, the medical pharmacovigilance management controller 114*a* retrieves an integration file. In one implementation, the medical pharmacovigilance management controller 114*a* may retrieve an attachment URL. The attachment URL may link to a JSON file where case membership data to be integrated is contained. The JSON file from the attachment URL may be retrieved. In another implementation, the medical pharmacovigilance management controller 114*a* initializes and retrieves all the IDs of an object record that has changed since the last successful run.

At 614, the medical pharmacovigilance management controller 114*a* executes the integration by translating and mapping the data object records in the retrieved JSON file in 613 to the pharmacovigilance data model schema. After completion of the translation, the integration data in the JSON file is saved into the medical pharmacovigilance management database 115.

At 615, the medical pharmacovigilance management controller 114*a* determines if there are additional jobs to run. If so, the medical pharmacovigilance management controller 114*a* schedules the next job in the priority order defined in the integration rule for the integration event. In one implementation, the medical pharmacovigilance management controller 114*a* executes the fourth job for the integration event, specifically a job for case membership delete.

At 616, the medical pharmacovigilance management controller 114*a* initializes and retrieves the case membership global ID. The case membership global ID may allow the identification of the case membership to be deleted, and any linked objects. The medical pharmacovigilance management controller 114*a* populates any related children and grandchildren of the subject using the global ID.

At 617, the medical pharmacovigilance management controller 114*a* extracts the case membership object and any object linked with the case membership global ID retrieved in 616, and executes a soft delete.

At 618, the medical pharmacovigilance management controller 114*a* determines if there are additional jobs to run. In this case, the last job was completed, so the medical pharmacovigilance management controller 114*a* updates the last successful run.

The method ends at 619.

In some embodiments, the data integration may generate an integration or connection data object that is structured according to a medical pharmacovigilance management system or case connection data schema. An example of the data schema is shown below:

```
{
    "global_id": "123999_OPP000000008004",
    "schema_version": "1.0",
    "clinops_study_link": "",
    "study_label": "EKE-ABC-456",
    "study_number": "EKE-ABC-456",
    "subject": "101-001",
    "study_country_code": "US",
    "clinops_study_country_link": "",
    "current_site_global_id": "123999_OP1000000003008",
    "current_site": "101",
    "current_site_name": "Wake Medical General Hospital",
    "gender": "female_v",
    "dob_normalized": "1969-03-04",
    "race":
[ "white_v", "native_hawaiian_or_other_pacific_islander_v", "black_or_african_american_
v" ],
    "ethnicity": "not_hispanic_or_latino_v",
    "age_group": "adult_v",
    "age_value": 39,
    "age_unit": "years_v",
    "age_at_vaccination": 39,
    "age_at_vaccination_unit": "years_v",
    "gestation_value": 3,
    "gestation_unit": "trimesters_v",
    "weight normalized_kg": [
        {
            "global_id": "WEIGHT_GID1_HERE",
            "value": 62,
            "date_value": "2023-05-25"
        },
        {
            "global_id": "WEIGHT_GID2_HERE",
            "value": 63,
            "date_value": "2023-05-29"
        },
        {
            "global_id": "WEIGHT_GID3_HERE",
            "value": 60,
            "date_value": "2023-06-25"
        }
    ],
    "height_normalized_cm": [
        {
            "global_id": "HEIGHT_GID1_HERE",
            "value": 162,
            "date_value": "2023-05-28"
        }
    ],
    "patient_id_value": "MyOtherID",
    "mrn_gp_value": "11152",
    "mrn_hospital_value": "934135",
    "mrn_investigation_value": "101-001",
    "mrn_specialist_value": "3039",
    "patient_randomization_number": "149",
    "study_reason": "clinical_trial_v",
    "last_menstrual_idate": [
        {
            "global_id": "LMD_GID1_HERE",
            "value": "2023-05-05",
            "date_value": "2023-05-05"
        },
        {
            "global_id": "LMD_GID2_HERE",
            "value": "2023-06-01",
            "date_value": "2023-06-01"
        }
    ],
    "gravida_gravidity": 1,
    "para_parity": 1,
    "pregnancy_case": false,
    "pregnant_at_vaccination": true,
    "parent_subject_number": "101-001-P",
    "medical_history_text": "Here is some general med history text",
    "concomitant_therapies": true,
    "pregnancy_info": [
        {
            "global_id": "PREG_INFO_GID_HERE",
            "pregnancy_conception_date": "2022-01-24",
            "pregnancy_due_date": "2022-12-26",
            "pregnancy_outcome": [ "fetal_death_stillborn_v" ],
```

-continued

```
        "delivery_method": [ "natural_v" ],
        "date_of_pregnancy_outcome": "2022-11-20"
      }
    ],
    "dod_normalized": "2023-06-09",
    "autopsy_value": false,
    "autopsy_reason_omitted": "ni_v"
    "cause_of_death": [
      {
        "global_id": "ICD_GID_HERE-SEQUENCE_HERE",
        "name_reported": "Death cause here...",
        "type": "reported_v",
        "name_meddra": "987654321"
      }
    ],
    "events": [
      {
        "global_id": "AE_GID_HERE-SEQUENCE_HERE",
        "event_reported": "Severe Headache",
        "Ilt_code": "12345678",
        "onset_idate": "2023-06-12",
        "resolved_idate": "2023-06-17",
        "outcome": "fatal_v",
        "serious": "serious_highlighted_v",
        "aesi": true,
        "seriousness_criteria":
[ "disabling_incapacitating_v", "congenital_anomaly_birth_defect_v", "results_in_death_v"
],
        "ctcae_grade": "grade_4_v",
        "age_at_onset": 40,
        "age_at_onset_unit": "years_v",
        "event_country": "CA",
        "symptom_diagnosis": "diagnosis_v",
        "expedited_flag": false,
        "hcp_confirmed": false,
        "hospital_admission_date": "2023-06-14",
        "hospital_discharge_date": "2023-06-18",
        "days_hospitalized": 2,
        "hospital_name": "Wake Med Hospital",
        "hospital_city": "Cary",
        "hospital_state": "NC",
        "narrative": "Here is my narrative text... ",
        "reporters_comments": "Here is some reporter comments",
        "sender_comments": "Here is some sender comments...",
        "reporter_qualification": "qual_pharmacist_v",
        "reported_language": "en",
        "reporter_country": "US",
        "reporter_first_name": "Joe",
        "reporter_last_name": "Smith",
        "overall_action_taken": "dose_increased_v",
        "cm_link_drug_role": [
          {
            "global_id": "AE_TO_CM_LINK_GID_HERE",
            "cm_global_id": "CM_GUID_HERE_-1",
            "drug_role": "interacting_v"
          }
        ]
        "product_info": [
          {
            "global_id": "STUDY_PRODUCT_OYZ00000001",
            "action_taken": "dose_unchanged_v",
            "reaction_recurrence": "rechallenge_yes_recurrence_yes_v",
            "related_assessment": [
              {
                "global_id": "ASSESS_ID_OYZ00000001",
                "method_reported": "",
                "result_value": "not_related_v",
                "source_reported": "Healthcare Professional"
              }
            ]
          }
        ]
      }
    ],
    "medical_history": [
      {
        "global_id": "MED_HIST_GUID_HERE_-1",
        "name_reported": "Back pain",
        "Ilt_code": "12345678",
```

-continued

```
        "startdate_idate": "2021-03-30",
        "continuing_value": false,
        "enddate_idate": "2023-01-02",
        "comments": "Here the mh comments on this one..",
        "family_history": false,
        "illness_at_vaccination": false
    },
    {
        "global_id": "MED_HIST_GUID_HERE_-2",
        "name_reported": "Blurred Vision",
        "llt_code": "12345678",
        "startdate_idate": "2021-02-27",
        "continuing_value": true,
        "enddate_idate": "2022-06-21",
        "comments": "Here the mh comments on this one..",
        "family_history": false,
        "illness_at_vaccination": true
    }
],
"drug_history": [
    {
        "global_id": "DRUG_HIST_GUID_HERE_-1",
        "name_reported": "Losartin",
        "startdate_idate": "2021-03-29",
        "end_date_idate": "2022-11-02",
        "age_at_vaccination": 48,
        "age_at_vaccination_unit": "years_v",
        "product_type": "drug_v" ,
        "indication_reported": "Tremors",
        "reaction_reported": "Back pain"
    },
    {
        "global_id": "DRUG_HIST_GUID_HERE_-2",
        "name_reported": "Aspirin",
        "startdate_idate": "2020-11-28",
        "end_date_idate": "2021-10-28",
        "age_at_vaccination": 44,
        "age_at_vaccination_unit": "years_v",
        "product_type": "nutritional_v",
        "indication_reported": "Back pain",
        "reaction_reported": "Headaches"
    },
    {
        "global_id": "DRUG_HIST_GUID_HERE_-3",
        "name_reported": "Some Other Pill",
        "startdate_idate": "2021-02-03",
        "end_date_idate": "2022-09-04",
        "age_at_vaccination": 60,
        "age_at_vaccination_unit": "years_v"
        "product_type": "device_v",
        "indication_reported": "Headaches",
        "reaction_reported": "Tremors"
    }
],
"test_results": [
    {
        "global_id": "LAB_TEST_GUID_HERE_-1",
        "date_idate": "2023-06-13",
        "name_reported": "Lab Test Name 3",
        "name_meddra": "123456789",
        "result_value": 9.3,
        "result_code": null,
        "result_text": "Lab Test Result Text 4",
        "result_unit": "mmol_g_v",
        "result_qualifier": "mmol_g_v"
        "normal_low_value": "3.1",
        "normal_high_value": "98.9",
        "comments": "Here are some lab comments",
        "more_information_available": false
    },
    {
        "global_id": "LAB_TEST_GUID_HERE_-2",
        "date_idate": "2023-06-10",
        "name_reported": "Lab Test Name 2",
        "name_meddra": "123456755",
        "result_value": null,
        "result_code": "negative_v",
        "result_text": "Lab Test Result Text 1",
        "result_unit": "",
```

-continued

```
      "result_qualifier": "",
      "normal_low_value": null,
      "normal_high_value": null,
      "comments": "Here are some lab comments",
      "more_information_available": false
    },
    {
      "global_id": "LAB_TEST_GUID_HERE_-3",
      "date_idate": "2023-06-15",
      "name_reported": "Lab Test Name 2",
      "name_meddra": "123456755",
      "result_value": 43.6,
      "result_code": null,
      "result_text": "Lab Test Result Text 3",
      "result_unit": "mg_dl_v",
      "result_qualifier": "mg_dl_v"
      "normal_low_value": "1.2",
      "normal_high_value": "98.9",
      "comments": "Here are some lab comments",
      "more_information_available": true
    }
  ],
  "products": [
    {
      "global_id": "CM_GUID_HERE_-1",
      "product_reported": "Tylenol",
      "country_obtained": "US",
      "blinded": false,
      "gestation_exposure_number": 3,
      "gestation_exposure_unit": "trimesters_v",
      "device_name_part": "Device name stuff here",
      "device_evaluated": "yes_v",
      "device_usage_type": "device_evaluation_v",
      "date_implanted_idate": "2023-06-09",
      "date_explanted_idate": "2023-06-14",
      "device_age": 5,
      "device_age_unit": "months_v",
      "additional_information_coded": [ "overdose_v" , "misuse_v" , "abuse_v" ],
      "dispense": [
        {
          "global_id": "CM_DISPENSE-GUID_HERE_-1",
          "firstadmin_idate": "2023-05-02",
          "lastadmin_idate": "2023-06-15",
          "duration_number": 5,
          "duration_unit": "days_v",
          "dose_number": 10,
          "dose_text": "Less than a trace",
          "dose_unit": "mg_v",
          "dose_unit_text": "Another unknown unit in text field",
          "frequency_number": 1,
          "frequency_unit": "per_month_v",
          "patient_adminroute": "050",
          "patient_adminroute_text": "Some route text here for CM",
          "patient_adminroute_termid": "CM route term ID",
          "patient_adminroute_termid_version": "CM route term id version",
          "anatomical_site": "left_arm_v",
          "batchlot_number": "CM batch lot number here",
          "dose_form_termid": "CM dose form term ID",
          "dose_form_termid_version": "CM dose form term ID versoin",
          "dose_form_text": "CM dose form text",
          "parent_adminroute_text": "CM parent route text here",
          "parent_adminroute": "048",
          "parent_adminroute_termid": "CM parent route term ID",
          "parent_adminroute_termid_version": "CM route term ID version"
        }
      ]
    },
    {
      "global_id": "CM_GUID_HERE_-2",
      "product_reported": "Aspirin",
      "country_obtained": "US",
      "blinded": false,
      "gestation_exposure_number": 3,
      "gestation_exposure_unit": "trimesters_v",
      "device_name_part": "Device name stuff here",
      "device_evaluated": "no_v",
      "device_usage_type": "initial_use_v",
      "date_implanted_idate": "2023-06-10",
      "date_explanted_idate": "2023-06-17",
```

-continued

```
        "device_age": 3,
        "device_age_unit": "months_v",
        "additional_information_coded": ["overdose_v", "off_label_use_v"],
        "dispense": [
          {
            "global_id": "CM_DISPENSE-GUID_HERE_-1",
            "firstadmin_idate": "2023-05-14",
            "lastadmin_idate": "2023-06-09",
            "duration_number": 5,
            "duration_unit": "days_v",
            "dose_number": 100,
            "dose_text": "Less than a trace",
            "dose_unit": "mg_v",
            "dose_unit_text": "Some unknown unit here",
            "frequency_number": 4,
            "frequency_unit": "per_month_v",
            "patient_adminroute": "050",
            "patient_adminroute_text": "Some route text here for CM",
            "patient_adminroute_termid": "CM route term ID",
            "patient_adminroute_termid_version": "CM route term id version",
            "anatomical_site": "right_thigh_v",
            "batchlot_number": "CM batch lot number here",
            "dose_form_termid": "CM dose form term ID",
            "dose_form_termid_version": "CM dose form term ID versoin",
            "dose_form_text": "CM dose form text",
            "parent_adminroute_text": "CM parent route text here",
            "parent_adminroute": "016",
            "parent_adminroute_termid": "CM parent route term ID",
            "parent_adminroute_termid_version": "CM route term ID version"
          }
        ]
      },
      {
        "global_id": "STUDY_PRODUCT_OYZ00000001",
        "product_reported": "Active vs Placebo",
        "country_obtained": "US",
        "blinded": true
        "dispense": [
          {
            "global_id": "STUDY_PRODUCT_OYZ00000001-DISP-1",
            "firstadmin_idate": "2023-05-20",
            "lastadmin_idate": "2023-06-14",
            "duration_number": 3,
            "duration_unit": "days_v",
            "dose_number": 10,
            "dose_text": "Less than 0.1 mg",
            "dose_unit": "mg_v",
            "dose_unit_text": "Another unknown unit in text field",
            "frequency_number": 4,
            "frequency_unit": "per_hour_v",
            "patient_adminroute": "048",
            "patient_adminroute_text": "Some route text here for SD",
            "patient_adminroute_termid": "SD route term ID",
            "patient_adminroute_termid_version": "SD route term id version",
            "anatomical_site": "left_arm_v",
            "batchlot_number": "SD batch lot number here",
            "dose_form_termid": "SD dose form term ID",
            "dose_form_termid_version": "SD dose form term ID versoin",
            "dose_form_text": "SD dose form text",
            "parent_adminroute_text": "SD parent route text here",
            "parent_adminroute": "048",
            "parent_adminroute_termid": "SD parent route term ID",
            "parent_adminroute_termid_version": "SD route term ID version"
          }
        ]
      }
    ]
  }
```

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

In all descriptions of "servers" or other computing devices herein, whether or not the illustrations of those servers or other computing devices similarly show a server-like illustration in the figures, it should be understood that any such described servers or computing devices will similarly per form their described functions in accordance with computer readable instructions stored on a computer-readable media that are connected thereto.

Resources may encompass any types of resources for running instances including hardware (such as servers, clients, mainframe computers, networks, network storage, data sources, memory, central processing unit time, Scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and Software infrastructures configured to form a virtual organization comprised of multiple resources which may be in geographically disperse locations.

Various terms used herein have special meanings within the present technical field. Whether a particular term should be construed as such a "term of art, depends on the context in which that term is used. "Connected to," "in communication with or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time." "equivalent," "during," "complete," and the like should be understood to mean "substantially at the time." "substantially equivalent," "substantially during," "substantially complete," etc., where "substantially" means that such comparisons, measurements, and timings are practicable to accomplish the implicitly or expressly stated desired result.

The steps and/or operations described above in relation to an embodiment of the present disclosure may occur in a different order, or in parallel, or concurrently for different epochs, etc. depending on the specific embodiment and/or implementation, as would be understood by one of ordinary skill in the art. Different embodiments may perform actions in a different order or by different ways or means. As would be understood by one of ordinary skill in the art, some drawings are simplified representations of the actions performed, their descriptions herein simplified overviews, and real-world implementations would be much more complex, require more stages and/or components, and would also vary depending on the requirements of the particular implementation. Being simplified representations, these drawings do not show other required steps as these may be known and understood by one of ordinary skill in the art and may not be pertinent and/or helpful to the present description.

Similarly, some drawings are simplified block diagrams showing only pertinent components, and some of these components merely represent a function and/or operation well-known in the field, rather than an actual piece of hardware, as would be understood by one of ordinary skill in the art. In such cases, some or all of the components/modules may be implemented or provided in a variety and/or combinations of manners, such as at least partially firmware and/or hardware, including, but not limited to one or more application-specific integrated circuits ("ASICS"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a non-transitory computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

One or more processors, simple micro controllers, controllers, and the like, whether alone or in a multi-processing arrangement, may be employed to execute sequences of instructions stored on non-transitory computer-readable media to implement embodiments of the present disclosure. In some embodiments, hard-wired circuitry may be used in place of or in combination with software instructions. Thus, embodiments of the present disclosure are not limited to any specific combination of hardware circuitry, firmware, and/or software.

The term "computer-readable medium" as used herein refers to any medium that stores instructions which may be provided to a processor for execution. Such a medium may take many forms, including but not limited to, non-volatile and volatile media. Common forms of non-transitory computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium on which instructions which can be executed by a processor are stored.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field, such claims should not be limited by the language chosen under this heading to describe the so-called technical field. Further, a description of a technology in the "Background is not to be construed as an admission that technology is prior art to any invention(s) in this disclosure. Neither is the "Brief Summary" to be considered as a characterization of the invention(s) set forth in issued claims. Furthermore, any reference in this disclosure to "invention' in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The invention claimed is:

1. A computer-implemented method for providing a data translation registry for secure connection and integration of distinct data storages, the method comprising:

establishing a reference data storage in a medical data management system, wherein the medical data management system stores clinical trial data;

establishing a target data storage in a pharmacovigilance data management system, wherein the pharmacovigilance data management system stores safety data masking specific portions of personally identifying information (PII);

establishing a rule engine comprising one or more integration rules, wherein one integration rule contains a pre-defined priority order for scheduling a series of jobs related to an integration event;

establishing a data translation registry containing a set of integration events, wherein an entry in the data translation registry specifies an integration event type and contains integration event data in a pre-defined format according to the integration event type;

adding a first integration event to the data translation registry, wherein the first integration event is a modified serious adverse event case that requires changes forwarded to the medical pharmacovigilance management system;

retrieving a first integration file from a URL;

translating and mapping each object record in the first integration file from a first data schema of the reference data storage to a second data schema of the target data storage, wherein the first and second data schemas are distinct; and saving each translated and mapped object record in the first integration file to the pharmacovigilance data management system.

2. The computer-implemented method of claim 1 above, further comprising:

determining if there are additional jobs to run based on the pre-defined priority order for scheduling defined in the integration rule for the first integration event;

retrieving a first subject global ID;

extracting a first subject record corresponding to the first subject global ID;

populating child and dependent records of the first subject record; and deleting the first subject record, and populated child and dependent records of the first subject record from the pharmacovigilance data management system.

3. The computer-implemented method of claim 2 above, further comprising:

determining if there are additional jobs to run based on the pre-defined priority order for scheduling defined in the integration rule for the first integration event;

retrieving a second integration file from a second URL;

translating and mapping each object record in the second integration file from the first data schema of the reference data storage to the second data schema of the target data storage; and saving each translated and mapped object record in the second integration file to the pharmacovigilance data management system.

4. The computer-implemented method of claim 3 above, further comprising:

determining if there are additional jobs to run based on the pre-defined priority order for scheduling defined in the integration rule for the first integration event;

retrieving a first case membership global ID;

extracting a first case membership record corresponding to the first case membership global ID;

populating child and dependent records of the first case membership record; and deleting the first case membership record, and populated child and dependent records of the first case membership record from the pharmacovigilance data management system.

5. The computer-implemented method of claim 4 above, wherein the integration event may be any interaction between the reference and target data storage where data is exchanged.

6. The computer-implemented method of claim 4 above, further comprising:

establishing a message queue, wherein the messaging queue tracks notifications of data exchange requests between multiple systems.

7. The computer-implemented method of claim 6 above, further comprising:

after adding the first integration event to the data translation registry, sending a notification to the message queue.

8. The computer-implemented method of claim 7 above, wherein the message queue has an aggregation or deduplication lockout for a specified time such that multiple notifications are minimized.

9. The computer-implemented method of claim 4 above, wherein the first integration file from the first URL is a JSON file.

10. The computer-implemented method of claim 9 above, wherein the JSON file from the attachment URL may be retrieved by accessing an API call.

11. The computer-implemented method of claim 4 above, wherein the second integration file from the second URL is a JSON file.

12. The computer-implemented method of claim 11 above, wherein the JSON file from the attachment URL may be retrieved by accessing an API call.

13. The computer-implemented method of claim 4 above, wherein the first URL is an attachment URL that links to a JSON file where subject data to be integrated is contained.

14. The computer-implemented method of claim 4 above, wherein the second URL is an attachment URL that links to a JSON file where case membership data to be integrated is contained.

15. The computer-implemented method of claim 4 above, further comprising: updating a last successful run upon completion.

16. The computer-implemented method of claim 4 above, wherein the integration event type may be one selected from the following: an insert or update of subject information, insert or update of case membership information, or deletion of a subject information, deletion of a case membership information.

17. A computer-implemented method for providing a data translation registry for secure connection and integration of distinct data storages, the method comprising:

establishing a reference data storage in a medical data management system, wherein the medical data management system stores clinical trial data;

establishing a target data storage in a pharmacovigilance data management system, wherein the pharmacovigilance data management system stores safety data masking specific portions of personally identifying information (PII);

establishing a rule engine comprising one or more integration rules, wherein one integration rule contains a pre-defined priority order for scheduling a series of jobs related to an integration event;

establishing a data translation registry containing a set of integration events, wherein an entry in the data translation registry specifies an integration event type and contains integration event data in a pre-defined format according to the integration event type;

adding a first integration event to the data translation registry, wherein the first integration event is a modified serious adverse event case that requires changes forwarded to the medical pharmacovigilance management system;

retrieving a first integration file from a URL;

translating and mapping each object record in the first integration file from a first data schema of the reference data storage to a second data schema of the target data storage, wherein the first and second data schemas are distinct;

saving each translated and mapped object record in the first integration file to the pharmacovigilance data management system;

determining if there are additional jobs to run based on the pre-defined priority order for scheduling defined in the integration rule for the first integration event;

retrieving a first subject global ID;

extracting a first subject record corresponding to the first subject global ID;

populating child and dependent records of the first subject record;

deleting the first subject record, and populated child and dependent records of the first subject record from the pharmacovigilance data management system;

retrieving a second integration file from a second URL;

translating and mapping each object record in the second retrieved integration file from the first data schema of the reference data storage to the second data schema of the target data storage;

saving each translated and mapped object record in the second integration file to the pharmacovigilance data management system;

retrieving a first case membership global ID;

extracting a first case membership record corresponding to the first case membership global ID;

populating child and dependent records of the first case membership record; and deleting the first case membership record, and populated child and dependent records of the first case membership record from the pharmacovigilance data management system.

* * * * *